(12) United States Patent
Ramachandran et al.

(10) Patent No.: US 11,580,152 B1
(45) Date of Patent: Feb. 14, 2023

(54) USING PATH-BASED INDEXING TO ACCESS MEDIA RECORDINGS STORED IN A MEDIA STORAGE SERVICE

(71) Applicant: Amazon Technologies, Inc., Seattle, WA (US)

(72) Inventors: Akhil Ramachandran, Hillsboro, OR (US); Ahmet Gurcan, Portland, OR (US); Meera Jindal, Portland, OR (US); Benjamin Aldouby Schwartz, Baltimore, MD (US); Abilash Ravikumar, Portland, OR (US); Ryan Farris, Bellevue, WA (US); Saurav Sengupta, Beaverton, OR (US); Dylan Kyle Abraham, Portland, OR (US); Michael Kale, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 16/799,756

(22) Filed: Feb. 24, 2020

(51) Int. Cl.
*G06F 16/41* (2019.01)
*G06F 16/955* (2019.01)
*G06F 16/185* (2019.01)

(52) U.S. Cl.
CPC ............ *G06F 16/41* (2019.01); *G06F 16/185* (2019.01); *G06F 16/955* (2019.01)

(58) Field of Classification Search
None
See application file for complete search history.

(56) References Cited

U.S. PATENT DOCUMENTS

| 10,546,016 | B1* | 1/2020 | DiMaria | G06F 16/686 |
| 10,805,688 | B1* | 10/2020 | Long | H04N 21/6131 |
| 2003/0005464 | A1* | 1/2003 | Gropper | G16H 30/20 709/219 |
| 2013/0080268 | A1* | 3/2013 | Gordon | G06F 16/41 709/217 |

(Continued)

OTHER PUBLICATIONS

Christopher Müller et al "A VLC Media Player Plugin enabling Dynamic Adaptive Streaming over HTTP", MM'11, Nov. 28-Dec. 1, 2011, Scottsdale, Arizona, USA. Copyright 2011 ACM 978-1-4503-0616-Apr. 11, 2011 (Year: 2011).*

(Continued)

*Primary Examiner* — Uyen T Le
(74) *Attorney, Agent, or Firm* — Robert C. Kowert; Kowert, Hood, Munyon, Rankin & Goetzel, P.C.

(57) ABSTRACT

A media storage service may store a plurality of copies of a same media recording in cloud DVR, one copy specific to one of a plurality of clients. The client may interact directly with the media storage service based on path-based indexing techniques for playback of the media recording. The client may send a request, including a path of a manifest file associated with the copy specific to the client, to the media storage service. The manifest file may include information indicating respective paths of one or more segments of the copy. The media storage service may identify and return the manifest file to the client. The media storage service may further receive requests from the client to access the segments of the copy. The requests may include the respective paths, based on which the media storage service may retrieve the segments for the client to play.

17 Claims, 6 Drawing Sheets

(56) References Cited

U.S. PATENT DOCUMENTS

| | | | | |
|---|---|---|---|---|
| 2013/0283231 | A1* | 10/2013 | Van Megchelen | G06F 16/955 717/106 |
| 2014/0280750 | A1* | 9/2014 | Panje | H04L 67/561 709/219 |
| 2016/0366198 | A1* | 12/2016 | Jennings | H04N 21/8456 |
| 2017/0060892 | A1* | 3/2017 | Vuppula | G06F 16/178 |
| 2018/0063594 | A1* | 3/2018 | Alexander | H04N 21/23439 |
| 2019/0174175 | A1* | 6/2019 | Elbert | H04N 21/2353 |

OTHER PUBLICATIONS

Cisco Cloud Object Storage Release 3.8.1 API Guide. "Chapter 7—Fanout API". Available Jul. 13, 2020 at https://www.cisco.com/c/en/us/td/docs/video/virtualized_video_processing/cloud_object_storage/3-12-1/api-guide/cos-3-12-1-api-guide/fanout-api.pdf, pp. 1-10.

\* cited by examiner

USING PATH-BASED INDEXING TO ACCESS MEDIA RECORDINGS STORED IN A MEDIA STORAGE SERVICE

BACKGROUND

Cloud Digital Video Recorder (DVR) allows media contents (e.g., TV programs, movies, audio or video streaming, etc.) to be recorded and saved for clients to play at the clients' convenience. Compared to traditional DVRs, cloud DVR saves the media recordings in network-based storage resources (e.g., a service provider's cloud) rather than local storage devices, thus providing more cost-efficient storage and better resilience. Certain policies require the service provider to maintain separate copies of the media recording specific to the clients (even though the contents of the copies are identical), so that one copy can be played only for one specific client like the client's private copy. Traditionally, playback of a media recording by the client may require a recording manager to function as a middle layer to implement retrieval of the copy specific to a client from the plurality of copies from the storage resources. For instance, the client may utilize a media player to submit a HyperText Transfer Protocol (HTTP) based message to the recording manager. The player may include an index number in the header of the HTTP message, which indicates the specific copy to be retrieved. The recording manager may resolve a location of the specific copy on the storage resources based on the index number, retrieve the private copy and return it to the client to play back by the player. There may be a few issues in such playback approaches. One, the recording manager needs to track information of copies of media recordings in order to be able to resolve the location based on a given index number. When the number of clients and/or recordings increase, the information needed to be tracked by the recording manager may become large and complicated. Two, since the playback has to use the recording manager as the middle layer, this adds latency and can cause negative user experience. Three, most media players request playbacks by visiting websites, e.g., Uniform Resource Locators (URLs), via web browsers. It is not common for the players to alter the URLs to add the indexing information, e.g., in the header in a HTTP message. Thus, a client may have only limited choices of players to use to perform the above described playback. Thus, it is desirable to have a flexible solution to access cloud DVR recordings stored in a media storage service.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Digital video recorders (DVRs) allow media contents (e.g., TV programs, movies, audio or video, etc.) to be recorded and saved in a local storage device (e.g., a hard disk, a flash drive, memory card of a set top box) for clients to play at the clients' convenience. Cloud DVR stores the media recordings in network-based storage resources (e.g., a service provider's cloud), thus providing more cost-efficient storage and better resilience. Certain policies require that the service provider to maintain separate copies of the media recording specific to the customers (even though the contents of the copies are identical), so that one copy can be played only for one client like the client's private copy. This is to simulate the scenario where individual clients save their individual copies in their physic devices, such that one client can only access his/her dedicate copy (i.e., private copy) of the media recording. A recording manager is generally used to manage the storing and retrieval of recordings to and from the service provider's storage resources. For instance, the recording manager may be implemented based on a HTTP based Registered Input-Output (RIO) Fanout Application Program Interface (API). The recording manager may request creation of a number of copies of a media recording of the same content to be saved on a storage resource. For instance, the recording manager may send a PUT message with specified X-Fanout-Copy-Count (e.g., when X-Fanout-Copy-Count equals to 3, it means to create 3 separate copies) to save the specified number of copies of a media recording to the storage resource. Each copy may be assigned a unique index number for individual clients, thus making each copy a private copy for the corresponding client. Further, a manifest file, e.g., a text,) ML or JSON file, may be generated along with the creation of the media content, e.g., by an encoder, and maintained at the storage resource to track information about the copies. A manifest file may also include information describing a media recording, such as content type (e.g., audio, video, or text), content name, start and end time of the recording, bitrate, codec type, content language, etc. In addition, each copy of the media recording may contain one or more segments, each representing a chunk of recording of the media content for a period of time. For instance, if a TV program lasts 60 minutes and each chunk records 10-minute of the program, each copy may include 6 segments.

In this disclosure, the terms "client" and "player" may be used exchangeably to broadly refer to a media player or other types of media content playing applications that may be used by a customer (or subscriber) to perform various cloud DVR and playback operations. What is important is that only one unique copy of the same media recording may be assigned and played for one specific customer or client. In some embodiments, the client may interact with the recording manager to retrieve the client's private copy from the storage resource. For instance, in playback, the media player may request for the specific copy of the media recording using an index parameter. Based on the index parameter, the recording manager may resolve the location of the specified private copy on the storage resource, retrieve the copy and return it to the media player. To perform the retrieval, the recording manager may have to track the relationships between clients, their private copies, index numbers and individual locations—i.e., what index number corresponds to what private copy of what client at what location on the storage resource. When the number of clients and copies increase, the information needed to be tracked by the recording manager may become large and complicated. Further, the above described playback requires the recording manager as a middle layer to retrieve the private copy. This adds latency and may cause negative user experience. Moreover, most media players visit websites such as Uniform Resource Locators (URLs) when playing back media recordings, and it is not common for players to alter the URLs to provide the indexing information. Thus, the client may have to use specifically-designed players in order to perform the traditional playback operations. This limits the choice of media players on the client end.

Various techniques for access cloud DVR recordings stored in a network-based media storage service based on path-based indexing are described herein. The path-based indexing techniques may allow media players to use path information to interact directly with the media storage service to play private copies of media recordings specific to clients, without a recording manager as a middle layer. This may thus reduce the latency and provide more flexibility for the clients to select/use their favored media players. In some embodiments, the media storage service may receive a request from a recording manager to create a plurality of copies of a media recording (of the same content) on one or more storage resources of the media storage service, each copy purposefully specific to one client as the client's private copy. Further, the recording manager may cause the media storage service to create and store a plurality of manifest files, each manifest file associated with one copy of the media recording. Each manifest file may comprise information indicating respective paths of the one or more segments of the associated copy. In some embodiments, the respective paths of the segments may be indicated relative to the path of the manifest file. Thus, given the path of the manifest file, the paths of the segments of the specific copy may be easily determined with respect to the path of the manifest file. In some embodiments, the paths of the manifest file and/or segments are in form of URLs. The paths (e.g., URL) of the manifest file and segments may function as pointers to the actual (physical) addresses of the manifest file and respective segments on the storage resources. Therefore, the client may interact directly with the media storage service, based on the paths, to access the manifest file and retrieve the copy specific to the client.

In playback, a client may submit a request for playback of a media recording from a media player or other types of player applications, according to some embodiments. For instance, the client may log in an account with credentials in a browser of the player, view a list of available media recordings (e.g., based on subscriptions of the client to the cloud DVR service), and select one media recording to play. In some embodiments, the selection may be submitted to a recording manager that, in turn, may return a path of a manifest file that is unique and specific to the client to the player. Once receiving the path of the manifest file, the player may send a request directly (without the recording manager) to the media storage service, which includes the path of the manifest file. Upon receiving the request, the media storage service may parse the path and translate it into the actual physical address of the manifest file on the storage resources of the media storage service. The media storage service may identify the manifest file and return it to the client. As described above, the manifest file may include information indicating respective paths of one or more segments of the copy specific to the client. In some embodiments, the respective paths may be indicated relative to the path of the manifest file, and both may be in the form of URLs. Thus, upon receiving the manifest file, the client's player may send requests that include the respective paths to access the segments, e.g., one-by-one. The media storage service, in response to receiving the access requests, may again parse the paths and determine the physical addresses of the respective segments based on the paths. The media storage service may retrieve the individual segments from the determined locations and return them to the client for play. Compared to traditional approaches, in the techniques described herein, the recording manager may not have to memorize what copy of the media recording corresponds to what client. Instead, this may be maintained by the media storage service. In some embodiments, in response to the requests from the client to access segments of a copy of the media recording, the media storage service may "randomly"

assign an available copy of the media recording as the private copy specific to this client, e.g., by selecting a copy that has not been assigned to any client yet from the plurality of copies as the available copy. The media storage service may pair the paths of the segments (given by the client) with the respective physical addresses of the segments of the assigned copy. In some embodiments, the paths of the manifest file and/or the segments may comprise a unique label, e.g., a prefix, specific to the client. For instance, the prefix may include information representing a geographic location, an IP address, and/or an account number. The media storage service may identify one of the plurality of copies (that has not been assigned to any client yet), based on the prefix, and assign the identified copy as the private copy specific to the client. For instance, the media storage service may store the plurality of copies at different geographic locations (e.g., at availability zones in the same or different regions). In some embodiments, the prefix may indicate a geographic location of the client, and accordingly, the media storage service may fetch a copy from a location close to the client and assign it as the private copy specific to the client, thus reducing the delivery latency. In some embodiments, the prefix may indicate an IP address of the client, and the media storage service may examine the IP address and implement access control to recorded media contents. For examples, clients located in different regions may have different levels of access to one particular media content. Once a copy has been assigned to one specific client, the media storage service may store the information for future playback. For instance, when the client demands to play the same media recording again, the media storage service may translate the paths in the access requests to the location of the prior assigned copy, thus the same copy continuously played to the same client (as the private copy). In some embodiments, the manifest file associated with a copy may be created on-the-fly, e.g., by the media storage service, based on a base manifest file in response to receiving the request from the client for playback. For instance, the content of the manifest file may be duplicated from that of the base manifest file, while the path of the newly-created manifest file may be generated with reference to that of the base manifest file.

Figure 1:
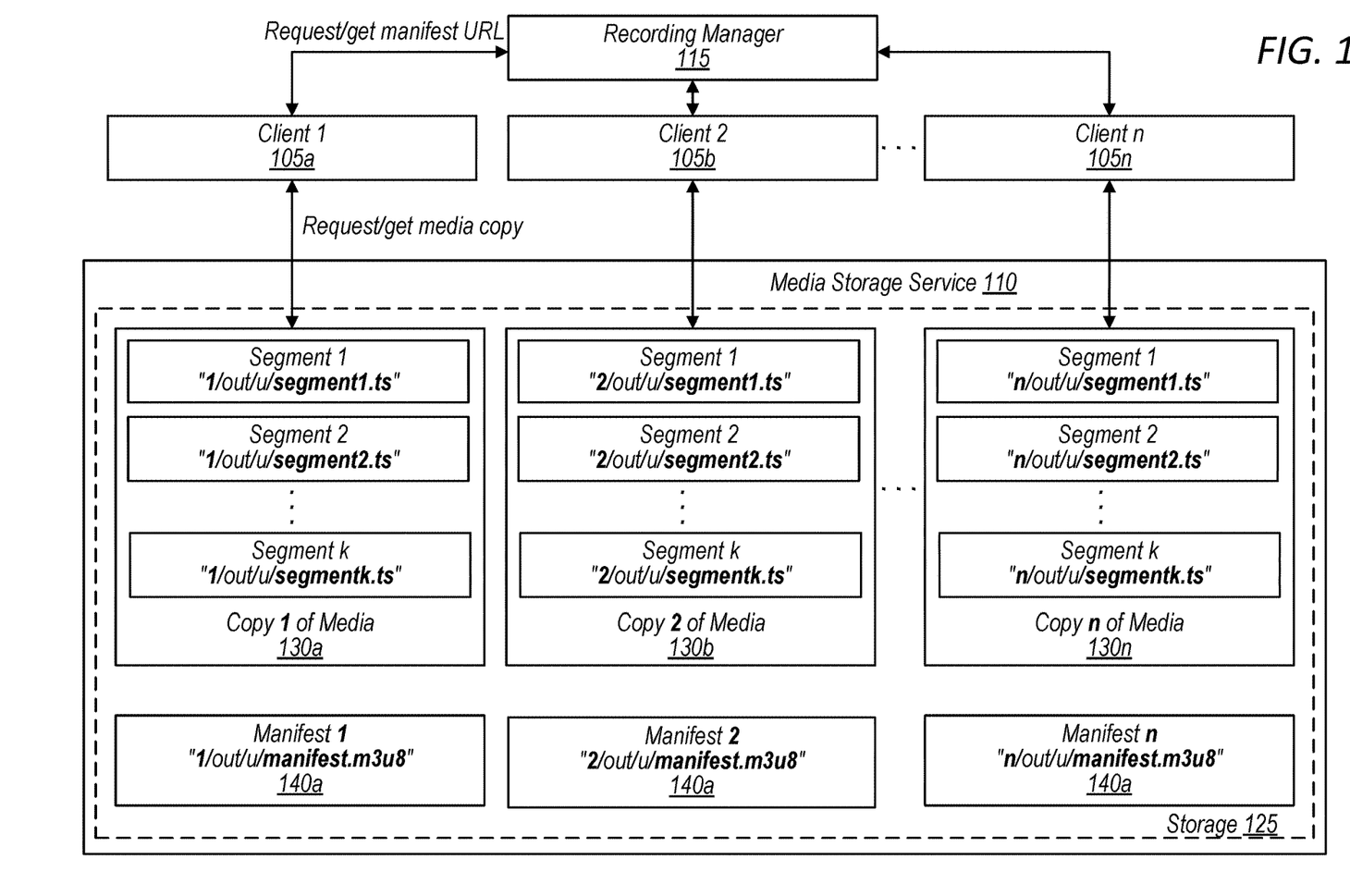
FIG. 1 is a block diagram illustrating example playback of a media recording from a media storage system for a client, according to some embodiments.

FIG. 1 shows example playback of a media recording from a media storage service for a client, according to some embodiments. In FIG. 1, media storage service 110 may store a plurality of copies of a media recording 130a-130n on one or more storage resources 125. The contents of copies 130a-130n may be identical, and each of copies 130a-130n may be assigned specific to one of clients 105a-105n. For instance, copy 130a may be specific to client 105a, copy 130b specific to client 105b, and copy 130n specific to client 130n, and so on. In some embodiments, each copy 130a-130n may further include one or more segments 1 . . . k, each segment representing a chunk of recording of the media content for a period of time. For instance, if a TV program lasts 60 minutes and each chunk records 10-minute of the program, each copy may include 6 segments (e.g., k=6). In some embodiments, media storage service 110 may store a set of manifest files 140a-140n, each associated with one copy of the media recording 130a-130n. For instance, manifest file 140a may be associated with copy 1 of the media recording 130a, manifest file 140b associated with copy 2 of the media recording 130b, manifest file 140n associated with copy n of the media recording 130n, and so on. In some embodiments, the contents of manifest files 140a-140n may be the same. For instance, each manifest file 140a-140n may contain the following information:
./segment1.ts
./segment2.ts
. . .
./segmentk.ts In some embodiments, in playback, clients 105a-105n may select media recordings for playback and send the request to recording manager 115. In return, for each client 105a-105n, recording manager 115 may return a path of a manifest file associated with a copy of the media recording specific to each of the clients 10a-105n. For instance, since copy 130a is specific to client 105a, recording manager may return a path of manifest file 140a that is associated with copy 130a to client 105a. Similarly, because copy 2 is specific to client 105b, recording manager may return a copy of manifest file 140b associated with copy 130b to client 105b, and so on. The information in each manifest file 140a-140n, as described above, may indicate respective paths of the segments of the associated copies 130a-130n. In some embodiments, the respective paths of the segments of the associated copies 130a-130n may be indicated relative to the path of manifest files 140a-140n, respectively. In some embodiments, the paths of manifest files 140a-140n and respective paths of the segments of copies 130a-130n may be included in URLs. For instance, the path of manifest file 140a may be "1/out/u/manifest.m3u8", then the respective paths of the segments of associated copy 130a may be "1/out/u/segment1.ts", "1/out/u/segment2.ts", "1/out/u/segmentk.ts", and so on. Similarly, the path of manifest file 140b may be "2/out/u/manifest.m3u8", then the respective paths of the segments of associated copy 130b may be "2/out/u/segment1.ts", "2/out/u/segment2.ts", "2/out/u/segmentk.ts", and so on. Comparing the above path of manifest file 140a versus the paths of segments 1-k of copy 130a, it may be noted that the respective paths of the segments are almost similar to that of manifest file 140a, except that the path-and-file-name portion of the URL of manifest file 140a is replaced with the respective information of the segments contained in manifest file 140a. For instance, the path of segment 1 of copy 130a may be created by replacing the path-and-file-name portion of the URL of manifest file 140a (e.g., manifest.m3u8) with the information of segment 1 in manifest file 140a (e.g., segment1.ts). Thus, given the path and content of manifest 140a, client 105a may quickly determine the respective paths of the segments of the associated copy of the media recording 130a. The same may apply to other manifest files 140b-140n and associated copies 130b-130n, as well. Note that, for purposes of illustration, in the above example, the respective paths of the segments may be indicated relative to the path of the manifest file by replacing the path-and-file-name portion of the URL of the manifest file. In some embodiments, the respective paths of the segments may be indicated by various ways. For instance, when the paths of the manifest files and segments are included in URLs, the respective paths of the segments may be indicated with respect to the path of the manifest file based on specific keywords in host names and/or ports in the URLs.

In some embodiments, once receiving the path of the manifest file, from then on clients 105a-105n may interact directly (without a recording manager) with media storage service 110 to retrieve assigned copies 130a-130n for playback. In some embodiments, clients 105-105n may each send a request to media storage service 110, wherein the individual requests may include paths of the assigned manifest files 140a-140n. For instance, client 105a may send the request to media storage service 110, including the path of manifest file 140a such as "1/out/u/manifest.m3u8". In response to the request, media storage service 110 may parse the request, treat the path "1/out/u/manifest.m3u8" as a pointer, and translate the path into the physical address of manifest file 140a on storage resources 125. Media storage service 110 may identify manifest file 140a based on the resolved address and return manifest file 140a to client 105a. With the path and content of manifest 140a, client 105a may quickly determine the respective paths of the segments 1-k of the associated copy of the media recording 130a, as described above. For instance, client 105a may determine that manifest file 140 includes information about segments 1-k, and the path of segment 1 of copy 130a is "1/out/u/segment1.ts" (the path of segment 2 is "1/out/u/segment2.ts" and the path of segment k is "1/out/u/segmentk.ts", and so on). Client 105a may use the respective paths of the segments to playback the media recording, for example, by requesting access to the segments 1-k. For instance, client 105a may send a request to media storage service 110 to access segment 1 of copy 130a, wherein the request may include the path of the segment 1 "1/out/u/segment1.ts". Media storage service 110 may treat the path "1/out/u/segment1.ts" as a pointer and translate it into the physical address of the segment 1 on storage resources 125. Accordingly, media storage service may retrieve the segment 1 from the determined physical address and return the segment to client 105a. Similarly, client 105a may access and get segments 2-k from media storage service 110 according to the respective paths of the segments 2-k. In some embodiments, client 105a may request the segments one-by-one. In some embodiments, client 105a may request more than one segments at once and buffer the files at the client's player.

In some embodiments, media storage service 110 may determine the pairing relationship between clients 105a-105n, manifest files 140a-140n, and copies 130a-130n prior to the playback. For instance, when manifest file 140a and copy 130a are created in storage resources 125, media storage service 110 may assign copy 130a as the private copy specific to client 105a and associate manifest file 140a with copy 130a— thus forming a sort of "look-up table." Thus, when media storage service 110 receives paths in the access request from client 105a, e.g., "1/out/u/segment1.ts", media storage service 110 may check the look-up table and link "1/out/u/segment1.ts" to the physical address of segment 1 of copy 130a specific to client 105a. In some embodiments, the above relationship between clients 105a-105n, manifest files 140a-140n, and copies 130a-130n may not have to be determined ahead of time. Instead, media storage service 110 may specify one of the copies 130a-130n that has not been assigned to any client yet as the private copy specific to client 105a, on-the-fly, e.g., in response to receiving the access request from client 105a. For instance, initially media storage service 110 may not have to associate manifest file 140a with copy 130a and may not have to assign both to client 105a. When client 105a request for playback of the media recording, recording manager 115 may still provide the path of manifest file 140a (e.g., "1/out/u/manifest.m3u8") to client 105a. Based on the path of manifest 140a, client 105a may request and receive manifest 140a from media storage service 110a. With the path (e.g., 1/out/u/manifest.m3u8) and content (e.g., ./segment1.ts) of manifest 140a, client 105a may quickly determine the respective paths of the segments 1-k, as described above. For instance, client 105a may determine that the path of segment 1 is "1/out/u/segment1.ts" and send an access request including this path to media storage service 110. In response to the access request, media storage service 110 may determine one from copies 130a-130n that has not been assigned to any client as the private copy specific to client 105a. For instance, media storage service 110 may determine that copy 130n (rather than 130a) has not been assigned to any client yet, and thus associate copy 130n with manifest file 140a and assign both to client 105a. Accordingly, media storage service 110 may translate the path of segment 1 from client 105a, such as "1/out/u/segment1.ts" into the physical address of segment 1 of copy 130n and retrieve the segment 1 of copy 130n to client 105a. Once a copy has been assigned to one specific client, media storage service 110 may store the information for future playback. For instance, in the immediately above example, when client 105a demands to playback the same media recording again, media storage service 110 may translate the paths in the access requests from 105a to the location of the prior assigned copy 130n, thus the same copy 130n may be continuously played to the same client 105a (as the private copy).

In some embodiments, the path of manifest files 140a-140n and/or respective paths of the segments of associated copies 130a-130b may include individual unique labels, e.g., prefixes, specific to respective clients 105a-105n. For instance, in the above example, the paths of manifest 140a and copy 130a's segments may include the prefix "1" that may be specific to client 105a. In some embodiments, the prefix may represent representing a geographic location, an IP address, and/or an account number of the specific client. Based on the prefix, media storage system 110 may implement various optimizations for a quick delivery of copy 130a to client 105a (mimicking operations of a content delivery network (CDN)). For instance, the media storage service may store the plurality of copies at different geographic locations (e.g., at availability zones in the same or different regions). In some embodiments, the prefix may indicate a geographic location of the client, and accordingly, the media storage service may fetch a copy from a location close to the client and assign it as the private copy specific to the client, thus reducing the delivery latency. In some embodiments, the prefix may indicate an IP address of the client, and the media storage service may examine the IP address and implement access control to recorded media contents. For examples, clients located in different regions may have different levels of access to one particular media content. For purposes of illustration, only prefixes are described herein. In some embodiments, the paths of the manifest file and segments specific to the client may be labeled in various ways. For instance, the specific paths unique for the client may be identified by suffixes, special characters, or other types of marks embedded in the paths of the manifest files and segments. In some embodiments, manifest files 140a-140n may be created on-the-fly, e.g., by media storage service 110, based on a base manifest file (not shown) in response to receiving the playback request from clients 105a-105n. As described above, the base manifest file may be created along with the original media content by an encoder, and stored to media storage service 110 to a path specified by the recording manager. For instance, the path of the base manifest file may be specified as "out/u/manifest.m3u8" and the content of the base manifest file may include the following information:

./segment1.ts
./segment2.ts
. . .
./segmentk.ts

Thus, in response to a playback request from client 105a, the recording manager may create a path of a manifest file specific to client 105a (e.g., by adding a prefix "1" to the path of the base manifest file "out/u/manifest.m3u8" to create the path "1/out/u/manifest.m3u8") and send this path to client 105a. When client 105a uses this path to request the manifest file from media storage service 110, media storage service 110 may, in response to the request, create manifest file 140a based on the base manifest file (e.g., by duplicating the content of the base manifest file) and map the given path (e.g., "1/out/u/manifest.m3u8") to the physical address of the newly-created manifest file 140a. In case manifest file 140a (that is associated with copy 130a specific to client 105a) already exists in media storage service 110, media storage service 110 may simply translate the given path of the manifest file (e.g., "1/out/u/manifest.m3u8") to the physical address of the readily-available manifest file 140a.

Figure 2:
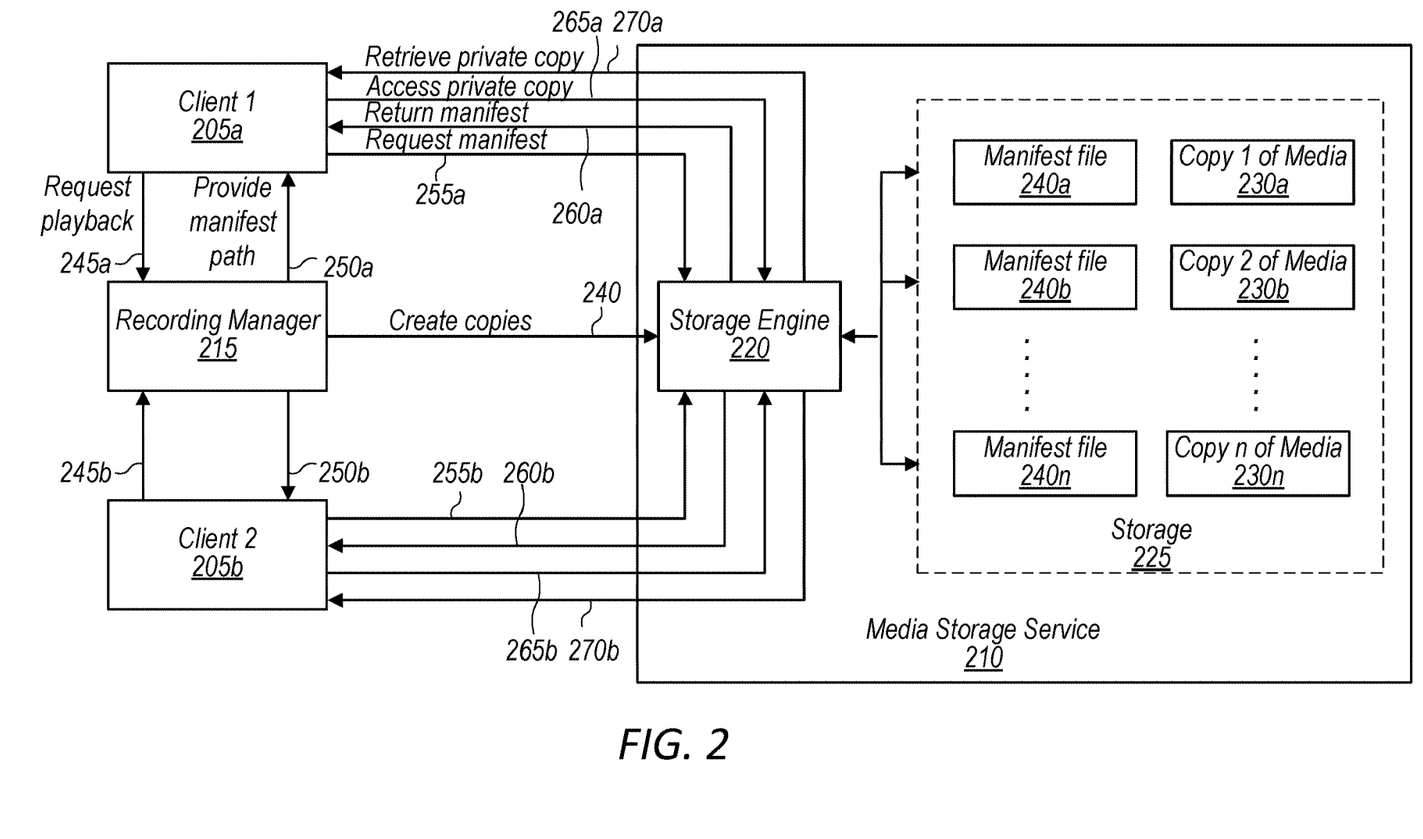
FIG. 2 is a block diagram illustrating example interactions between client, recording manager, and media storage system for storage and playback of a media recording, according to some embodiments.

FIG. 2 shows example interactions between client, recording manager, and media storage service for storage and playback of a media recording, according to some embodiments. In FIG. 2, recording manager 215 may submit request 240 to media storage system 210 to create a specified number of copies of a media recording e.g., 230a-230n, for specific clients, e.g., 205a-205b. Copies 230a-230n may contain the same media content, one copy specific for one client 205a-205n. Note that there may be a plurality of clients but only clients 205a-205b are shown in FIG. 2 for purposes of illustration. Recording manager 215 may include various devices and/or applications (e.g., a set-top box, a smart TV or device, etc.) that may interface with a content provider to facilitate recording of a media program (e.g., a TV program, audio or video streaming, etc.) for customers (or subscribers). An original copy of the media recording, along with a base manifest file describing the content of the media recording such as recorded segments, may be provided to media storage service 210, e.g., by an encoder from the content provider. Request 240 may be received by storage engine 220 of media storage service 210. In response to request 240, storage engine 220 may cause media storage system to create the specified number of copies of the media recording 230a-230n (and manifest files 240a-240n) on one or more storage resources 225 of media storage system 210. In some embodiments, media storage service 210 may also create a plurality of manifest files 240a-240n associated with the individual copies 230a-230n. When clients 205a-205b play back the media recording, they may submit requests 245a-245b, respectively, to recording manager 215. In some embodiments, requests 245a-245b may include necessary information for obtaining authorization of the playback for clients 205a-205b. For instance, requests 245a-245b may include respective account and subscription information of clients 205a-205b. Once authorized, recording manager 215 may provide a path of a manifest file associated with a specific copy of the media recording to one each client 205a-205b, respectively. For instance, when copy 230a is specific to client 205a and copy 230b specific to client 205b, recording manager 215 may return the respective paths of manifest files 240a-240b, associated with 230a-230b respectively, to clients 205a-205b (as indicated by 250a-250b). In some embodiments, the paths of manifest files 240a-240b may be in form of URLs. In some embodiments, the paths of manifest files 240a-240b may include respective prefixes associated with clients 205a-205b, as described above.

In some embodiments, after receiving the paths of manifest files 240a-240b, clients 205a-205b may interact directly with media storage service 210 from then on. In some embodiments, clients 205a and 205b may send requests 255a-255b to media storage service 210, wherein requests 255a-255b may include the paths of manifest files 240a-240b, respectively. In response to requests 255a-255b, storage engine 220 may resolve the locations of manifest files 240a-240b based on their paths in requests 255a-255b, identify manifest files 240a-240b, and return the manifest files 240a-240b to clients 205a-205b, respectively (as indicated by 260a-260b). With the content and path of individual manifest file, clients 205a-205b may determine paths of the segments of associated copies 230a-230b, as described above. For instance, when the path of manifest file 240a is "1/out/u/segment1.ts" and the information in manifest file 240a includes:

./segment1.ts
./segment1.ts
. . .
./segmentk.ts

Client 205a may determine that copy 230a contains k segments, and their respective paths are "1/out/u/segment1.ts", "1/out/u/segment2.ts", "1/out/u/segmentk.ts", and so on. In some embodiments, clients 205a-205b may submit requests 265a-265b to access the segments of the associated copies 230a-230b, wherein requests 265a-265n may include the above respective paths of the segments of copies 230a-230b. For instance, request 265a from client 205a may include the paths "1/out/u/segment1.ts", "1/out/u/segment2.ts", "1/out/u/segmentk.ts" of segments 1-k of copy 130a. In some embodiments, client 205a may request the segments one-by-one. In some embodiments, client 205a may requests more than one segments at once. Based on the respective paths of the segments, storage engine 220 of media storage service 210 may determine the physical addresses of the segments and retrieve them for clients 205a-205b (as indicated by 270a-270b). As described above, in some embodiments, media storage service 210 may determine the paring relationship between clients 205a-205b, manifest files 240a-240b, and copies 230a-230n prior to the playback, e.g., according to a "look-up table." In some embodiments, media storage service 210 may assign private copies specific to clients 205a-205b on-the-fly. For instance, in response to access request 265a, storage engine 220 may determine one (e.g., 230n) from the plurality of copies 230a-230n that has not been assigned to any client yet and assign this copy (e.g., 230n) as the private copy specific to client 205a. Based on the assignment, storage engine 220 may translate the paths of the respective segments included in request 265a (e.g., "1/out/u/segment1.ts", "1/out/u/segment2.ts", "1/out/u/segmentk.ts", and so on) as the physical addresses of the segments1-k of the assigned copy (e.g., 230n). Storage engine 220 may retrieve the segments 1-k of the assigned copy (e.g., 230n) and return them to client 205a.

Figure 3A:
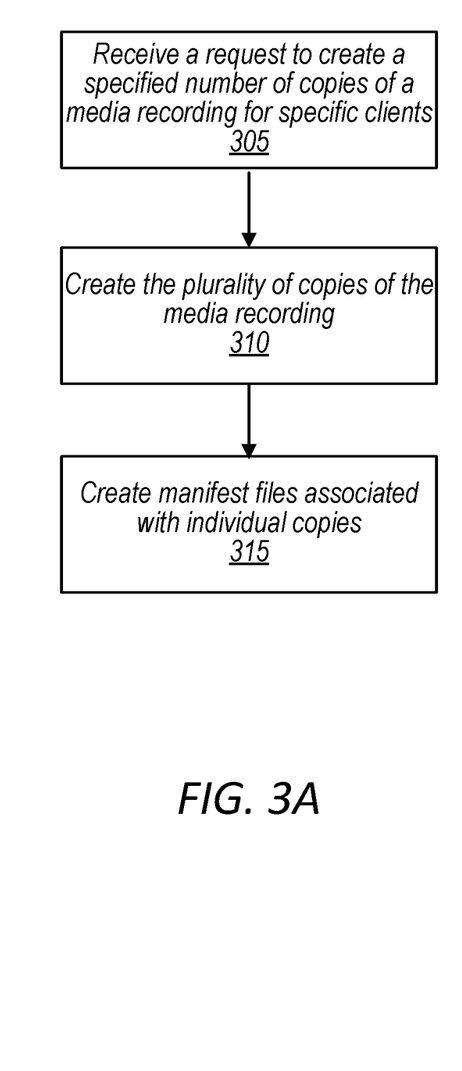
FIG. 3A is a flowchart illustrating an example operation of a media storage system, according to some embodiments.

FIG. 3A shows an example operation of a media storage service to create copies of a media recording, according to some embodiments. In FIG. 3, the media storage service, e.g., media storage service 110/220 described above in FIGS. 1-2 may receive a request, e.g., from a recording manager, to create a specified number of copies of the same media content for specific clients (block 305). The copies may contain the same media recording, such as one or more segments of the same media content, but each copy may be supposedly assigned to one specific client. In response to the request, the media storage service may create the specified number of copies and store them on one or more storage resources of the media storage service (block 310). In some embodiments, the media storage service may further create a plurality of manifest files associated with the individual copies of the media recording (block 315). One manifest file may be paired with one copy of the media recording, both of which may be later assigned to one specific client. The media storage service may provide paths of the manifest files, e.g., to the recording manager (block 315). In some embodiments, instead of creating a plurality of manifest files along with the creation of the copies of the media recording, the media storage service may create the additional manifest file(s) based on a base manifest file on-the-fly in response to a request from a client for a manifest file, as described above.

Figure 3B:
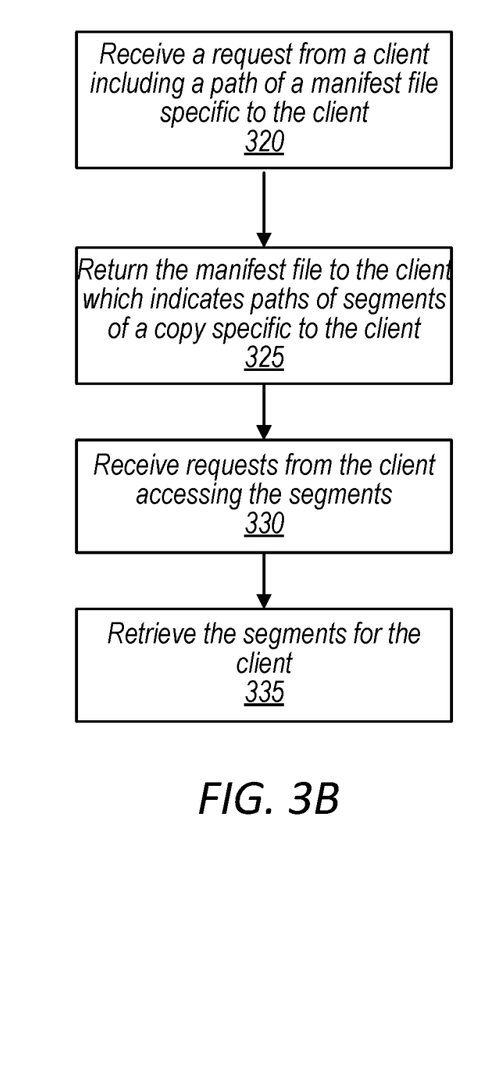
FIG. 3B is a flowchart illustrating another example operation of a media storage system, according to some embodiments.

FIG. 3B is a flowchart illustrating an example operation of a media storage system, according to some embodiments. In FIG. 3, the media storage service may receive a request from a client, wherein the request may include a path of a manifest file associated with a copy of the media recording specific to the client (block 320). In some embodiments, the path of the manifest file may be in included URL of the received request. In some embodiments, the path of the manifest file may include a unique label, e.g., with a prefix, specific to the client. As described above, the client may receive the path of the manifest file from a recording manager in response to a playback request from the client to the recording manager. The media storage service may identify the manifest file based on the path of the manifest file and return the manifest file to the client (block 325). As described above, the media storage service may treat the path of the manifest file as a pointer and translate it into the actual physical address of the manifest file on the storage resources. In some embodiments, the manifest file may include information indicating respective paths of the one or more segments of the copy of the media recording specific to the client. With the path and content of the manifest file, the respective paths of the segments of the associated copy may be determined. In some embodiments, the respective paths of the segments may be indicated relative to the path of the manifest file, e.g., by replacing the path-and-file-name portion of the URL of the manifest file with the respective information of the segments in the manifest file, as described above. The media storage service may receive one or more requests from the clients to access the one or more segments of the copy specific to the client, wherein the one or more requests include the respective paths of the segments indicated in the manifest file (block 330). The media storage service may retrieve the segments of the copy specific to the client based on the respective paths (block 335). In some embodiments, the media storage service may treat the respective paths of the segments as pointers and resolve the physical addresses of the segments based on the respective paths for the retrieval. In some embodiments, the media storage service may pair the paths and physical addresses ahead of time and the "resolving" may be merely a look-up process based on the pre-determined pairing information. In some embodiments, the media storage service may assign a copy as private copy specific to the client on-the-fly. For instance, the media storage service may identify one from the plurality of copies that has not been assigned to any client yet, specify this copy as the private copy to the client, and retrieve segments of this copy to the client. In some embodiments, the media storage service may assign the copy, based on the prefix specific to client embedded in the respective paths of the segments.

Figure 4A:
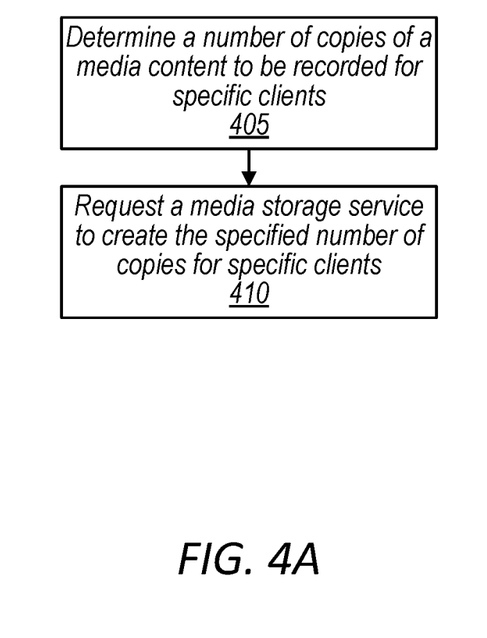
FIG. 4A is a flowchart illustrating an example operation of a recording manager, according to some embodiments.

FIG. 4A shows an example operation by a recording manager to create a plurality of copies of a media content, according to some embodiments. In FIG. 4A, the recording manager may determine a number of copies of a same media content to be recorded for specific clients (block 405). The recording manager may determine the number based on the recording requests from clients (before or during the broadcast of the media content). The recording manager may send a request to a media storage service to create the specified number of copies of the media recording (block 410). In response, the media storage service may access the media content, e.g., which have been provided by the content provider, e.g., through an encoder, and create the specified number of copies for the specific clients. In some embodiments, the media storage service may further create a plurality of manifest files, based on a base manifest file (which may be provided by the media content provider along with the original copy of the media content and may be stored at a path specified by the recording manager), one manifest file associated with one copy of the media recording specific to one client.

Figure 4B:
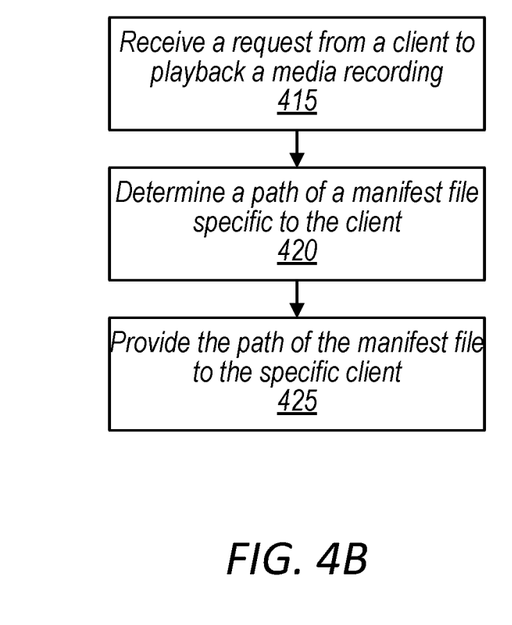
FIG. 4B is a flowchart illustrating another example operation of the recording manager, according to some embodiments.

FIG. 4B shows an example operation by a recording manager during playback, according to some embodiments. In FIG. 4B, the recording manager may receive a request from a client to playback a media recording (block 415). In some embodiments, the request may include information required for obtaining authorization for the playback, such as information about the client's account and program subscriptions, etc. When the playback request is authorized, the recording manager may determine a path of a manifest file for the specific client (block 420). In some embodiments, the information may be predetermined, prior to the playback, as to which manifest file and the manifest file's associated copy have been assigned to specific client, and the recording manager may identify the path of the manifest file based on the predetermined information. In some embodiments, the relationship may not have to be predetermined, and instead the recording manager may create the path of a manifest file to the specific client on-the-fly during the playback. For instance, as described above, the recording manager may create the path of a manifest based on the path of the base manifest file, e.g., by adding a prefix "1" to the path of the base manifest file, and send this path to the client. Once the manifest file is determined, the recording manager may provide a path of a manifest file to the client wherein the manifest file is associated with a copy of the media recording specific to the client (block 425). In some embodiments, when the path of the manifest file given to the client was determined on-the-fly as described above (block 420), the media storage service may, in response to the manifest request from the client, create a manifest file based on a base manifest file (e.g., by duplicating the content of the base manifest file), and map the given path of the manifest file to the physical address of the newly-created manifest file. In case if the media storage service has already create a manifest file for each of the plurality of copies of the media recording, the media storage service may simply identify the manifest file associated with the copy specific to the clients, and translate the given path of the manifest file to the physical address of the identified manifest file.

Figure 5:
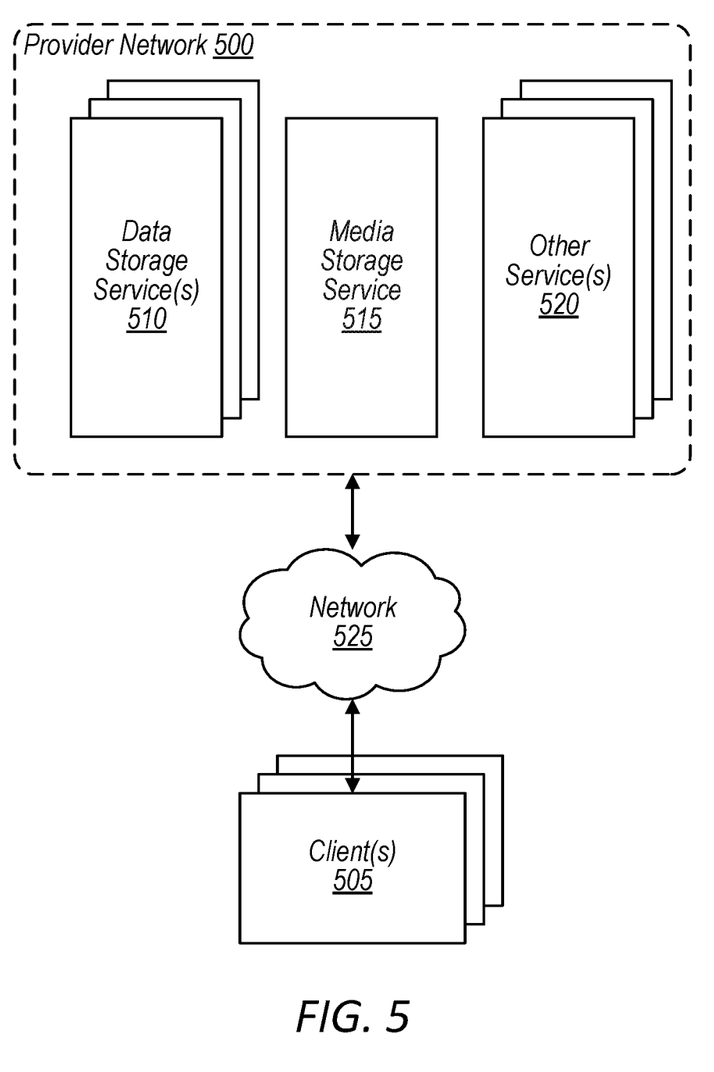
FIG. 5 is a block diagram illustrating providing an example media storage service by a provider network service, according to some embodiments.

FIG. 5 is a block diagram showing providing media storage as a provider network service, according to some embodiments. In FIG. 5, provider network 500 may be a private or closed system or may be set up by an entity such as a company or a public sector organization to provide one or more services (such as various types of cloud-based storage) accessible via the Internet and/or other networks to one or more client(s) 505. Provider network 500 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and storage services offered by provider network 500. In some embodiments, provider network 500 may implement various computing resources or services, such as a data storage service(s) 510 (e.g., object storage services, block-based storage services, or data warehouse storage services), media storage service 515, as well as other service(s) 520, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Data storage service(s) 510 may implement different types of data stores for storing, accessing, and managing data on behalf of client(s) 505 as a network-based service that enables one or more client(s) 505 to operate a data storage system in a cloud or network computing environment. For example, data storage service(s) 510 may include various types of database storage services (both relational and non-relational) or data warehouses for storing, querying, and updating data. Such services may be enterprise-class database systems that are scalable and extensible. Queries may be directed to a database or data warehouse in data storage service(s) 510 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 510 may also include various kinds of object or file data stores for putting, updating, and getting data objects or files, which may include data files of unknown file type. Such data storage service(s) 510 may be accessed via programmatic interfaces (e.g., APIs) or graphical user interfaces. Data storage service(s) 510 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, media storage service 515 may be provided by provider network 500 as a network-based service. For instance, media storage system 515 may include a storage engine (e.g., as storage engine 220 described in FIG. 2) that create, access, maintain and manage copies of media recordings stored on one or more storage resources of media storage service 515, data storage service(s) 510 or other service(s) 520. Media storage service 515 may store a plurality of copies of a media recording, received, e.g., from a recording manager (not shown), through network 525. The plurality of copies may contain the same content having one or more segments, each copy specific to one client 505. Media storage service 515 may receive a request from client 505 wherein the request may include a path of a manifest file associated with a copy of the media recording specific to client 505. Media storage service 515 may identify the manifest file based on the path of the manifest file and return it to client 505. The manifest file may include information indicating respective paths of the segments of the one copy specific to client 505. In some embodiments, the respective paths of the segments may be indicated relative to the path of the manifest file. Media storage service 515 further receive one or more requests from client 505 to access the one or more segments of the copy specific to client 505, wherein the one or more requests include the respective paths of the segments indicated in the manifest file. Based on the respective paths, media storage service 515 may retrieve the segments for client 505. As described above, in some embodiments, media storage service 515 may store information representing the pairing information between the manifest file, the copy of the media recording and client 505. In some embodiments, media storage service 515 may assign a copy from the plurality of copies on-the-fly as private copy specific to client 505 and use the assigned copy for playback of the media recording.

Other service(s) 520 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 510. Various other distributed processing architectures and techniques may be implemented by data processing services (e.g., grid computing, sharding, distributed hashing, etc.). Note that in some embodiments, data processing operations may be implemented as part of data storage service(s) 510 (e.g., query engines processing requests for specified data).

Generally speaking, client(s) 505 may encompass any type of client configurable to submit network-based requests to provider network 500 via network 525, including requests for storage services (e.g., a request to create, read, write, obtain, or modify data in data storage service(s) 510, a request to play a media recording by media storage service 515, etc.). For example, a given client 505 may include a suitable version of a web browser, or may include a plug-in module or other type of code module configured to execute as an extension to or within an execution environment provided by a web browser. Alternatively, a client 505 may encompass an application such as a database application (or user interface thereof), a media application, an office application or any other application that may make use of storage resources in data storage service(s) 510 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 505 may be an application configured to interact directly with provider network 500. In some embodiments, client(s) 505 may be configured to generate network-based services requests according to a Representational State Transfer (REST)-style network-based services architecture, a document- or message-based network-based services architecture, or another suitable network-based services architecture.

In various embodiments, network 525 may encompass any suitable combination of networking hardware and protocols necessary to establish network-based-based communications between client(s) 505 and provider network 500. For example, network 525 may generally encompass the various telecommunications networks and service providers that collectively implement the Internet. Network 525 may also include private networks such as local area networks (LANs) or wide area networks (WANs) as well as public or private wireless networks. For example, both a given client 505 and provider network 500 may be respectively provisioned within enterprises having their own internal networks. In such an embodiment, network 525 may include the hardware (e.g., modems, routers, switches, load balancers, proxy servers, etc.) and software (e.g., protocol stacks, accounting software, firewall/security software, etc.) necessary to establish a networking link between given client 505 and the Internet as well as between the Internet and provider network 500. It is noted that in some embodiments, client(s) 505 may communicate with provider network 500 using a private network rather than the public Internet.

Figure 6:
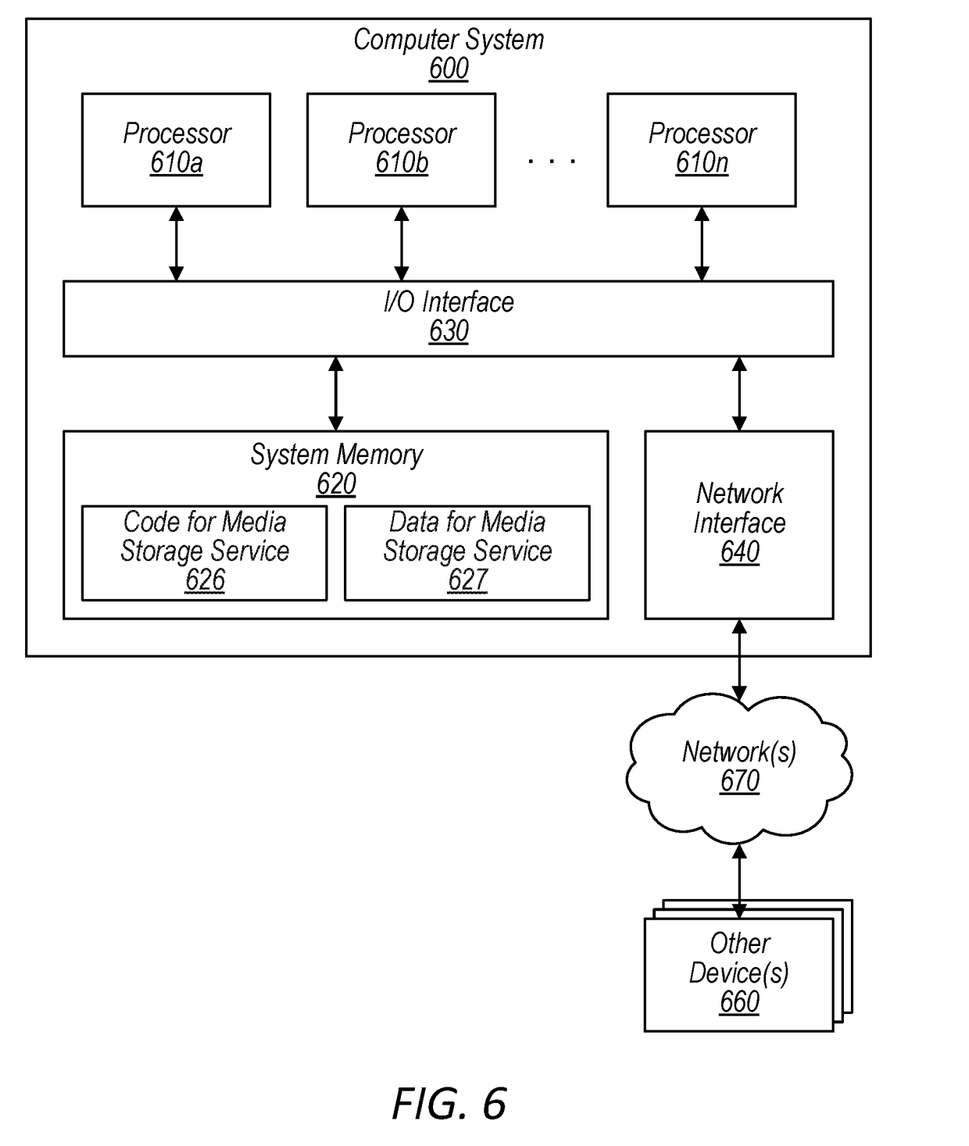
FIG. 6 is a block diagram an example computing system configured to implement the various techniques described herein, according to some embodiments.

FIG. 6 is a block diagram an example computing system configured to implement the various techniques described herein, according to some embodiments. In the illustrated embodiment, computer system 600 includes one or more processors 610 coupled to a system memory 620 via an input/output (I/O) interface 630. Computer system 600 further includes a network interface 640 coupled to I/O interface 630. While FIG. 6 shows computer system 600 as a single computing device, in various embodiments a computer system 600 may include one computing device or any number of computing devices configured to work together as a single computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be one embodiment of a computer-accessible medium configured to store instructions and data accessible by processor(s) 610. In various embodiments, system memory 620 may be implemented using any non-transitory storage media or memory media, such as magnetic or optical media, e.g., disk or DVD/CD coupled to computer system 600 via I/O interface 630. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640. In the illustrated embodiment, program instructions (e.g., code) and data implementing one or more desired functions, such as the functions of the media storage system described above in FIGS. 1-5, are shown stored within system memory 630 as code 626 and data 627.

In one embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices 660 attached to a network or networks 650, such as the media storage system as illustrated in FIGS. 1-6, for example. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks such as Fiber Channel SANs, or via any other suitable type of network and/or protocol.

In some embodiments, system memory 620 may be one embodiment of a computer-accessible medium configured to store program instructions and data as described above for FIG. 1-6. Generally speaking, a computer-accessible medium may include non-transitory storage media or memory media such as magnetic or optical media, e.g., disk or DVD/CD coupled to computer system 600 via I/O interface 630. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
one or more computing devices configured to implement a media storage service, the media storage service configured to:
store a plurality of copies of a media recording, wherein each copy of the plurality of copies includes one or more segments of the media recording and is specific to one of a plurality of clients;
receive a request from one of the clients to access the media recording, wherein the request includes a path of a manifest file associated with one of the copies of the media recording specific to the client stored in the media storage service;
identify the manifest file for the client based on the path of the manifest file, wherein the manifest file includes information indicating respective paths to storage locations of one or more segments of the media recording in the copy stored in the media storage service, and wherein the respective paths to storage locations of the one or more segments individually include at least one portion of the path of the manifest file;
return the manifest file to the client;
receive one or more requests from the client to access the one or more segments of the media recording, wherein the one or more requests include the respective paths to the storage locations of the segments including the at least one portion of the path of the manifest file; and
retrieve the one or more segments of the media recording for the client based on the respective paths of the segments including the at least one portion of the path of the manifest file.

2. The system of claim 1, wherein the media storage service is part of a provider network, and wherein the plurality of copies of the media recording are received via a network-based interface for the media storage service and stored in one or more storage resources that are implemented as part of the media storage service of the provider network.

3. The system of claim 1, wherein the path of the manifest file and the paths of the segments are respectively included in a Uniform Resource Locator (URL) of the requests received from the client.

4. The system of claim 1, wherein the paths of the manifest file and the paths of the segments respectively comprise a prefix specific to the client.

5. A method, comprising:
storing a plurality of copies of a media recording using a media storage service, wherein each copy of the plurality of copies includes one or more segments of the media recording and is specific to one of a plurality of clients;
receiving one or more requests from one of the clients to access the media recording, wherein the one or more requests include respective paths to storage locations of one or more segments of the media recording in one of the copies specific to the client stored in the medial storage service, and wherein the respective paths to storage locations of the one or more segments individually include at least one portion of a path of a manifest file; and
retrieving the one or more segments of the media recording for the client based on the respective paths of the one or more segments that include the at least one portion of the path of the manifest file.

6. The method of claim 5, further comprising:
receiving another request from the client to access the media recording, wherein the other request includes the path of the manifest file associated with the copy of the media recording specific to the client;
identifying the manifest file based on the path of the manifest file; and
returning the manifest file to the client.

7. The method of claim 5, wherein the path of the manifest file and the respective paths of the one or more segments of the media recording are respectively in form of a Uniform Resource Locator (URL).

8. The method of claim 7, wherein the URLs of the manifest file and the segments respectively comprise a prefix specific to the client.

9. The method of claim 8, wherein retrieving the one or more segments comprises:
identifying a copy of the media recording from the plurality of copies based on the prefix specific to the client; and
assigning the identified copy as the copy of the media recording specific to the client.

10. The method of claim 5, wherein retrieving the one or more segments comprises:
identifying a copy of the media recording from the plurality of copies that has not been assigned to any client yet; and
assigning the identified copy as the copy of the media recording specific to the client.

11. The method of claim 5, wherein the media storage service is part of a provider network, and wherein the plurality of copies of the media recording are received via a network-based interface for the media storage service and stored in one or more storage resources that are implemented as part of the media storage service of the provider network.

12. One or more non-transitory computer readable media comprising instructions which, when executed on or across one or more computing devices, cause the one or more computing devices to:
store a plurality of copies of a media recording using a media storage service, wherein each copy of the plurality of copies includes one or more segments of the media recording and is specific to one of a plurality of clients;
receive one or more requests from one of the clients to access the media recording, wherein the one or more requests include respective paths to storage locations of one or more segments of the media recording in one of the copies specific to the client stored in the media storage service, and wherein the respective paths to storage locations of the one or more segments individually include at least one portion of a path of a manifest file; and
retrieve the one or more segments of the media recording for the client based on the respective paths of the one or more segments that include the at least one portion of the path of the manifest file.

13. The one or more non-transitory computer readable media of claim 12, further comprising instructions which, when executed on or across the one or more computing devices, cause the one or more computing devices to:
receive another request from the client to access the media recording, wherein the other request includes the path of the manifest file associated with the copy of the media recording specific to the client;
identify the manifest file based on the path of the manifest file; and
return the manifest file to the client.

14. The one or more non-transitory computer readable media of claim 12, wherein the media storage service is part of a provider network, and wherein the plurality of copies of the media recording are received via a network-based interface for the media storage service and stored in one or more storage resources that are implemented as part of the media storage service of the provider network.

15. The one of more non-transitory computer readable media of claim 12, wherein the paths of the manifest file and the paths of the segments respectively comprise a prefix specific to the client.

16. The one or more non-transitory computer readable media of claim 15, wherein to retrieve the one or more segments, the instructions cause the one or more computing devices to:
    identify a copy of the media recording from the plurality of copies based on the prefix specific to the client; and
    assign the identified copy as the copy of the media recording specific to the client.

17. The one or more non-transitory computer readable media of claim 12, wherein the paths of the manifest file and the paths of the segments are respectively included in a Uniform Resource Locator (URL) of the requests received from the clients.

\* \* \* \* \*